United States Patent [19]

Niedermeyer

[11] 4,313,426
[45] Feb. 2, 1982

[54] SOLAR ENERGY COLLECTOR

[76] Inventor: William P. Niedermeyer, 1024 Mt. Mary Dr., Green Bay, Wis. 54301

[21] Appl. No.: 208,220

[22] Filed: Nov. 19, 1980

Related U.S. Application Data

[63] Continuation-in-part of Ser. No. 886,217, Mar. 13, 1978, abandoned.

[51] Int. Cl.³ .............................................. F24J 3/02
[52] U.S. Cl. .................................. 126/438; 126/447; 126/449
[58] Field of Search ............... 126/438, 439, 449, 450, 126/447, 446

[56] References Cited

U.S. PATENT DOCUMENTS

| | | | |
|---|---|---|---|
| 3,321,012 | 5/1977 | Hervey | 126/438 |
| 3,982,527 | 9/1976 | Cheng | 126/439 |
| 4,099,515 | 7/1978 | Schertz | 126/447 |
| 4,131,109 | 12/1978 | Coxon | 126/447 |
| 4,150,657 | 4/1979 | Bowen | 126/447 |
| 4,214,537 | 7/1980 | Niedermeyer | 126/446 |
| 4,239,034 | 12/1980 | Niedermeyer | 126/439 |
| 4,244,374 | 1/1981 | Man-El | 126/446 |

FOREIGN PATENT DOCUMENTS

| | | | |
|---|---|---|---|
| 2546619 | 4/1976 | Fed. Rep. of Germany | 126/444 |
| 2643431 | 4/1977 | Fed. Rep. of Germany | 126/444 |
| 2651602 | 5/1978 | Fed. Rep. of Germany | 126/271 |
| 2304875 | 11/1976 | France | 126/438 |

Primary Examiner—Samuel Scott
Assistant Examiner—G. Anderson
Attorney, Agent, or Firm—Francis J. Bouda

[57] ABSTRACT

A solar energy collector is shown which is comprised of an underlying support, a support surface, and a combined reflector and heat absorber. The combined reflector and heat absorber is formed from a continuous sheet of material to provide contiguous parabolic reflectors, each reflector having an upstanding heat absorber centrally located therein in the form of a fluid conduit. The absorber-fluid conduit is closed along one edge by the support surface or by a spacer between support surfaces. A pair of manifolds are operatively connected at the ends of the heat absorbers to enable heat-absorbing fluid to flow in from one manifold, through the absorber-conduits, and out the other manifold. The continuous formation of the parabolic reflectors and heat absorbers from one sheet provides production economies, manufacturing efficiencies and reduced weight and cost of the solar energy collector.

3 Claims, 3 Drawing Figures

SOLAR ENERGY COLLECTOR

The present invention is a Continuation-in-Part of my earlier application, Ser. No. 886,217, filed Mar. 13, 1978, now abandoned for "SOLAR ENERGY COLLECTOR" which is incorporated in its entirety in this application and made a part hereof.

BACKGROUND OF THE INVENTION

Solar energy collectors are well known in the art, but the present invention is directed to an inexpensive and simplified structure wherein a continuous shaped film provides parabolic reflective surfaces and heat-absorbing conduits. The film is supported by shaped support surfaces which not only hold the film in place but also conform to the shape of the underside of the parabolic reflectors and wherein the shaped support surfaces have structural rigidity provided by a bottom support of inexpensive construction.

The present application more clearly describes the structure originally shown in the parent application, Ser. No. 886,217. Furthermore, it distinguishes over the art of record in that case and the references cited during the prosecution of that application.

Early disclosures illustrate parabolic reflectors and heat absorbers, but the prior art fails to teach how to make the parabolic reflectors and the heat absorbers from a continuous sheet or film.

U.S. Pat. No. 4,120,283 of Eder, and U.S. Pat. No. 3,129,703 of Tabor show the use of foil—in Eder as a matrix of zig-zag folds, but without conduits or reflectors, and Tabor without reflective surfaces. Neither suggests the use of foil for a purpose other than absorption.

U.S. Pat. No. 4,150,657 of Bowen shows a flat plate collector formed from heavy gauge metal to provide "annular" conduits at spaced intervals, and subsequently, welded. There is no suggestion that foil could be used, nor that the continuous piece could be shaped into a *focusing* reflector.

West Germany Pat. No. 2,546,619 of Antonioli shows metal shaped in corrugated fashion, but the corrugations are arranged to yield functional results of a non-concentrating (full absorber) panel. There is no teaching of a reflective surface, central absorber, nor concentrating effect.

U.S. Pat. No. 4,131,109 of Coxon deals with a collector that is not a full absorber type, nor a full concentrating type. Coxon lacks a fluid channel in the central absorber, cannot restrict and contain fluids for ordered flow, and cannot be *folded* from a common piece of material. Further Coxon cannot be made from foil because it lacks underlying supports.

U.S. Pat. No. 3,321,012 of Hervey and U.S. Pat. No. 4,099,516 of Caulier do not teach the use of light-gauge foil for forming the reflector. Caulier also distinguishes over reflector *plate* material and *foil* used to reflectively cover the end plates (4A and 4B).

In both Hervey and Caulier, a member is interspersed between the absorber and the reflector surface, said member precluding the use of a common web or piece of material to form three sides of the absorber conduit.

In each case, the absorber pieces (15 of Hervey, 2 of Caulier) are distinctly identified as separate entities. Neither patent suggests or identifies the use of light-weight non-rigid materials to form the reflector.

U.S. Pat. No. 3,982,527 of Cheng is directed to a vertically extended heat branch with a small absorption coated heat sink to absorb concentrated focused solar rays. However, the heat must be conductively transferred to a heat transfer fluid contained in conduits behind the panel. In other embodiments, the parabolic shaped surface and absorber are both absorptively coated. Cheng does not teach the use of an enclosed absorber conduit in the central focal region and does not suggest or use foil.

In U.S. Pat. No. 4,024,852 of L'Esperance (and especially in FIG. 10), the substrate 63 is merely a "base" for a formed reflector shape 64 or a thin film 64 placed on top of a trough-like plastic foam shape. This second embodiment is no different from U.S. Pat. No. 3,847,136 of Salvail which also teaches the use of a full trough support with reflective foil inside the trough. Salvail's teaching was available to L'Esperance, but he—like all others before—failed to see that the reflective film could be shaped into a form that permits the beneficial results of integral vertically extended absorber.

L'Esperance teaches the use of a solid plate absorber (25) without internal fluid channels and, like Cheng, must depend on a horizontal, substantially extended conductive path to transfer heat to external fluid means. There is no suggestion of using foil in this special relationship of L'Esperance.

Although French Pat. No. 2,304,875 of Pinon and West German Pat. No. 2,643,431 of Swisspor AG suggest a focusing collector absorber and reflector made from the same piece of material, they can be distinguished over the present invention.

Swisspor AG uses a vertical extension of the reflector to support an *independent* conduit, but an upper part of said extension could also absorb heat. On the opposite co-acting side of the reflector, Swisspor AG chooses to terminate plate 25 adjacent the nadir of the reflector. Swisspor AG also lacks a cooperating under-support, even though Salvail's teaching was available, but went unrecognized. It is obvious that heavier gauge sheet material is used in Swisspor and that the extension 23 curves primarily as a support for conduit 21 (which is (are) curved and unsupported at the ends) 22—see FIG. 3.

Although Pinon suggests the construction of a reflector and absorber from a common piece of material, it does not teach the importance of a cooperating under-support as being necessary for the use of thin gauge materials like foil and selectively coated thin films, etc.

Lacking the necessary undersupport, Pinon obtains structural integrity by extending the base material (plastic across the top)but, by so doing, imposes other limitations:

(a) Pinon is limited to the use of transparent plastic in order to let solar rays penetrate the top cover, (b) by making the reflector-absorber-cover as an integral and completely self-contained unit, Pinon precludes the advantageous use of "folding" and high-speed production techniques since he is forced to extrude the integral assemblies in the direction of the conduit.

OBJECTS OF THE INVENTION

Accordingly, it is an object of the present invention to provide a solar energy collector of simplest construction possible wherein parabolic reflective surfaces and heat absorbers are formed from a continuous sheet of material.

It is a further object of the present invention to provide a thin-film-shaped continuous sheet combination solar ray reflector surface and heat absorbing conduit.

SUMMARY OF THE INVENTION

The present invention provides a solar energy collector wherein a plurality of parabolic reflective surfaces are formed from a continuous sheet of lightweight film or foil, in such a manner as to provide a plurality of troughs and crests, and with generally tubular shaped absorber means formed from the same sheet of film at the trough of each parabolic reflective surface. The design of the collector of this invention is intended to facilitate the construction from a single continuous web with each parabolic surface having an integral heat absorber associated therewith and formed from the web. The heat absorber means and integral parabolic surfaces are supported by surfaces which, in the preferred embodiment, are beam-like members appropriately spaced so as to reduce weight but adapted to retain the shaped film or foil in its appropriate disposition. Additionally, the support surfaces are disposed on an underlying support which provides the stability and rigidity for the support surfaces. Along each edge of the shaped film or foil surface, a manifold connects the ends of the conduits formed by the heat absorber so that appropriate heat-transmitting fluid may be guided from one manifold through the absorbers and out the other manifold.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized, and the invention is not limited to the precise arrangements and organizations or the instrumentalities as herein shown and described.

In the drawings, wherein like reference characters indicate like parts:

Figure 1:
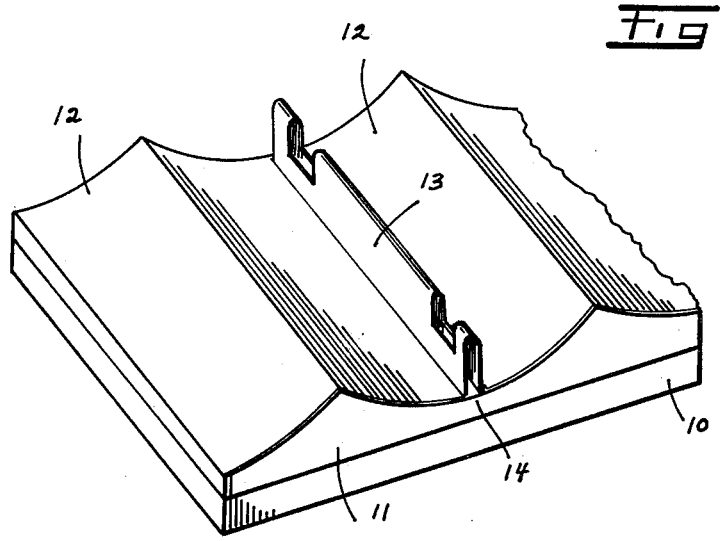
FIG. 1 is a fragmentary perspective view of the preferred embodiment of the present invention, illustrating how the reflective surface and the heat absorber are formed from a continuous sheet of thin film material, supported by a surface which itself rests upon an underlying support.

Referring now to FIG. 1, I show an underlying support 10 which may be any rigid, stable material and which may be of independent construction such as a rooftop, or other similar base.

The support surface 11, also shown in FIG. 1, preferably is a separate structure, as shown in FIG. 1, which fully supports not only the parabolic shaped reflector 12 but also the absorber 13.

In this construction, the support surface 11 provides a closure for the open edge of the conduit-like absorber 13, as is clearly shown at 14 in FIG. 1.

Figure 2:
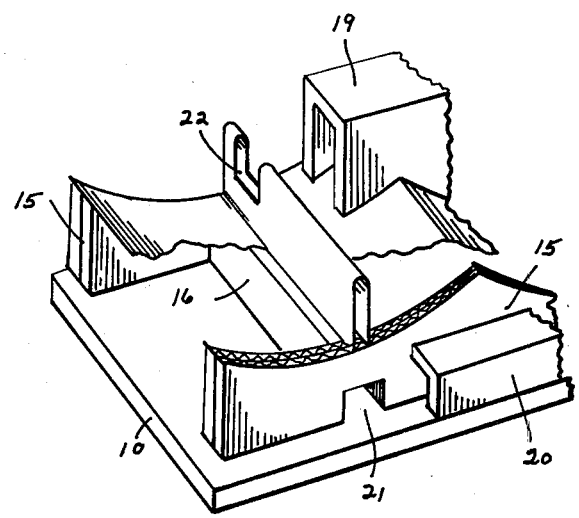
FIG. 2 is a perspective view similar to FIG. 1 illustrating another embodiment of the present invention utilizing a plurality of spaced, shaped beam-like members as the support surface.

In FIG. 2, I have illustrated how the support surface may be constructed of generally beam-like members 15. The beam-like members 15 rest upon the underlying support 10 and the distance between adjacent members 15 is determined by the gauge or stiffness of the sheet material from which the parabolic reflectors 12 and the absorbers 13 are formed.

As is shown in FIG. 2, this distance may be relatively small but in any event, a closure member 16 bridges the space between adjacent members 15, beneath the absorber 13, so as to provide a closure for the open edge of the tubular absorber 13.

Figure 3:
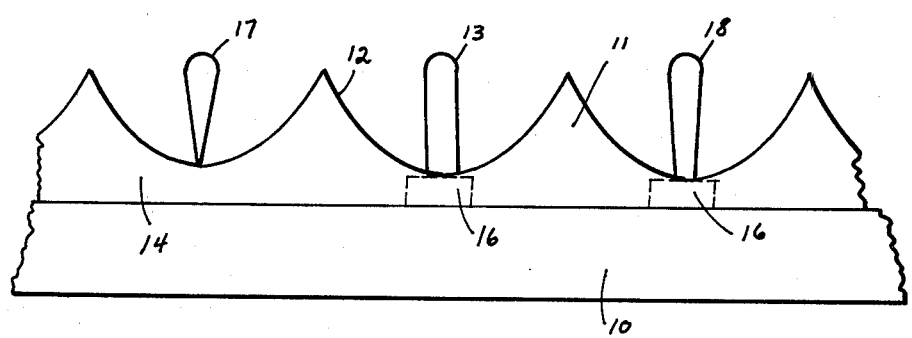
FIG. 3 is a schematic diagram indicating how the parabolic reflective surfaces and the absorber are formed from a single sheet of material, in continuous pattern, alternating between reflective surfaces and heat absorbers.

In FIG. 3, I have schematically illustrated alternate forms of shaping the absorbers 13 so that the closure 16 may be eliminated Attention is directed to the absorber 17 which is closed along the edge where the bottoms of the side walls of the absorber come together.

However, the absorber 18, also shown in FIG. 3, requires a closure 16 to complete the conduit-absorber through which the heat-absorbing fluid flows.

Referring now also to FIG. 2, I show the manifolds 19 and 20 which conduct the fluid-absorbing medium to and from the absorber-conduit, either through a port or aperture 21 in the manifold 20, or through a notch 22 in the manifold 19.

The construction of the manifolds and the notches or ports in the absorbers may be a matter of choice, as long as the fluid may enter from one manifold to an appropriate port, through an absorber, and out another appropriate port and its operatively-interconnected manifold.

Thus I have provided a solar energy collector, consisting of an underlying support, support surfaces, and appropriately-shaped film to provide the parabolic reflectors and heat absorber.

Referring now to the last mentioned element, it can be seen from FIGS. 1 and 3 that the sheet material is shaped to provide a series of parabolic reflectors 12 with the heat absorbers 13 interspersed between the reflectors.

The heat absorbers are formed at the nadir of the parabolic reflectors 12, and each combination of parabolic reflectors and absorber is followed by another reflector with its absorber, etc., etc., so that a series of reflectors and absorbers are formed from a single sheet.

As is understood in the art, solar rays impinging on the parabolic reflector surfaces 12 are directed to the heat absorber or conduit 13 through which the aforementioned heat-absorbing fluid passes from manifold to manifold to pick up the heat directed against the absorber by the sun's rays impinging thereon and directed thereto by the parabolic reflector surfaces adjacent the heat absorber.

I have constructed and arranged the structure of the present invention so that the parabolic reflectors and absorbers may be made continuously in a relatively high-speed automatic machine and so that the combined reflector and absorber surfaces can be handled independently of the support surfaces and the underlying supports to simplify and economize in the manufacturing procedure.

The support surfaces are shaped so that the upper faces thereof conform to the corresponding curvature of the reflective surface to be superimposed thereon.

In the embodiment shown in FIG. 1, the support surface is a continuous member extending from side to side of the foil or sheet so as to provide a base or underlying closure 14 for the open end of the heat absorber 13.

As is shown in FIG. 2, the beam-like support surfaces are spaced from each other to reduce the structural size and weight. To insure the fluid-tight characteristic of the absorber 13, the closure 16 extends between the beam-like members 15 insuring that the heat absorber 13 will be a fully-closed conduit.

It is to be understood that the present invention may be embodied in other specific forms without departing from the spirit or special attributes hereof, and it is, therefore, desired that the present embodiments be considered in all respects as illustrative, and therefore not restrictive, reference being made to the appended claims, rather than to the foregoing description to indicate the scope of the invention.

Having thus described my invention, what I claim as new and desire to protect by Letters Patent are the following:

1. A concentrating solar energy collector including:
    a continuous shaped sheet, a support surface, and an underlying support;
    said continuous sheet integrally forming a plurality of reflectors and heat absorbers;
    said reflectors being parabolically curved with an absorber at the nadir of each reflector;
    said absorber being an inverted generally u-shaped channel;
    a closure along the open edge of the channel to provide a closed conduit;
    inlet and outlet means at the ends of each absorber;
    a pair of manifolds operatively associated with the inlet and outlet means so that heat-absorbing fluid may flow from manifold to manifold through the absorbers.

2. A concentrating solar energy collector comprising:
    at least one parabolically curved reflector;
    at least one absorber;
    said absorber located symmetrically about a central plane coincident with the nadir of the reflector;
    said reflector and said absorber integrally formed from a continuous sheet of material;
    said absorber being hollow to provide a fluid conduit;
    non-conductive rigid support surface means for supporting the sheet material;
    said support surface means being shaped to conform to the curvature of the underside of the parabollic reflectors, and;
    underlying support means for said support surface means.

3. A concentrating solar energy collector comprising:
    an underlying support of non-conductive materials;
    a parabolically curved thin, non-rigid metallic reflective sheet material having an integrally formed central portion upwardly formed into an inverted "u" shape;
    said inverted "u" shape forming a central conduit with elongated planar side portions;
    said planar side portions arranged to absorb solar rays reflected from adjacent reflective portions of said parabolically curved sheet;
    a pair of manifolds;
    openings in said central conduit being operatively connected to said manifolds to provide a continuous channel for heat-absorbing fluid to flow from manifold to manifold through said conduits.

* * * * *